US011220930B2

United States Patent
Starr et al.

(10) Patent No.: US 11,220,930 B2
(45) Date of Patent: Jan. 11, 2022

(54) ASSEMBLY WITH PIN-MOUNTED CERAMIC MATRIX COMPOSITE MATERIAL COMPONENTS

(71) Applicants: Rolls-Royce Corporation, Indianapolis, IN (US); Rolls-Royce North American Technologies Inc., Indianapolis, IN (US)

(72) Inventors: Shaling Starr, McCordsville, IN (US); Aaron D. Sippel, Zionsville, IN (US); Ted J. Freeman, Danville, IN (US); David J. Thomas, Brownsburg, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 42 days.

(21) Appl. No.: 16/701,922

(22) Filed: Dec. 3, 2019

(65) Prior Publication Data

US 2021/0164365 A1 Jun. 3, 2021

(51) Int. Cl.
| | |
|---|---|
| *F01D 11/08* | (2006.01) |
| *F01D 25/24* | (2006.01) |
| *F01D 11/00* | (2006.01) |
| *F01D 25/00* | (2006.01) |

(52) U.S. Cl.
CPC ............ *F01D 25/246* (2013.01); *F01D 11/08* (2013.01); *F01D 11/005* (2013.01); *F01D 25/005* (2013.01); *F05D 2220/323* (2013.01); *F05D 2230/60* (2013.01); *F05D 2240/11* (2013.01); *F05D 2260/30* (2013.01); *F05D 2300/6033* (2013.01)

(58) Field of Classification Search
CPC ...... F01D 25/246; F01D 25/005; F01D 11/08; F01D 11/005; F05D 2220/323; F05D 2230/60; F05D 2240/11; F05D 2260/30; F05D 2300/6033; F16B 35/041; F16B 33/006; F16B 25/0094
See application file for complete search history.

(56) References Cited

U.S. PATENT DOCUMENTS

| | | | |
|---|---|---|---|
| 5,368,444 A | 11/1994 | Anderson | |
| 6,877,952 B2 | 4/2005 | Wilson | |
| 6,884,026 B2 | 4/2005 | Glynn et al. | |
| 7,416,362 B2 | 8/2008 | North | |
| 7,563,071 B2 | 7/2009 | Campbell et al. | |
| 7,874,059 B2 | 1/2011 | Morrison et al. | |
| 7,988,395 B2 * | 8/2011 | Steffier | F16B 3/00 411/385 |
| 9,863,265 B2 | 1/2018 | Stapleton et al. | |
| 10,145,252 B2 * | 12/2018 | Kirby | F01D 11/001 |

(Continued)

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

A turbine shroud assembly includes a carrier, a blade track segment, and an attachment pin. The carrier is arranged to extend circumferentially at least partway around an axis. The blade track segment includes a runner that faces the axis to define a portion of a primary gas path of the gas turbine engine and an attachment flange that extends radially away from the runner. The attachment pin is configured to mount the blade track segment to the carrier.

20 Claims, 4 Drawing Sheets

(56) References Cited

U.S. PATENT DOCUMENTS

| | | |
|---|---|---|
| 10,301,960 B2 | 5/2019 | Stapleton et al. |
| 10,378,386 B2 | 8/2019 | Roussille et al. |
| 2016/0265389 A1* | 9/2016 | Jarmon ................. C04B 35/638 |
| 2016/0376921 A1* | 12/2016 | O'Leary ................. F01D 25/12 |
| | | 415/116 |
| 2017/0350268 A1* | 12/2017 | McCaffrey .............. F01D 11/08 |
| 2018/0051591 A1 | 2/2018 | Quennehen et al. |
| 2018/0073398 A1 | 3/2018 | Quennehen et al. |
| 2021/0047936 A1 | 2/2021 | McCaffrey |

* cited by examiner

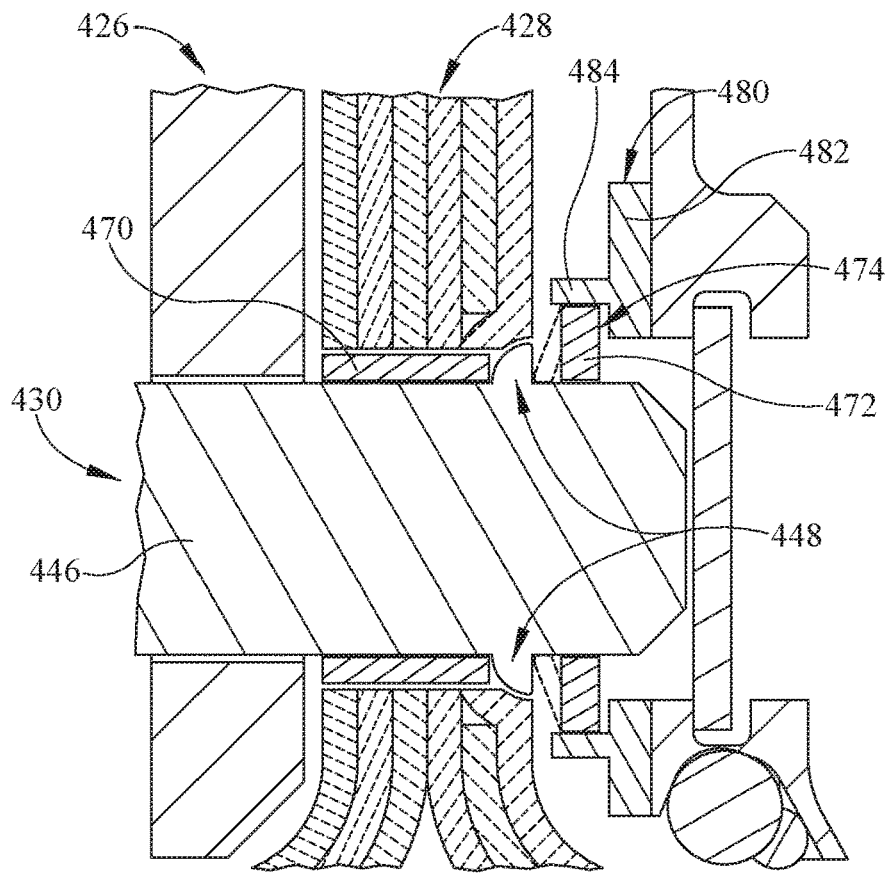
FIG. 6
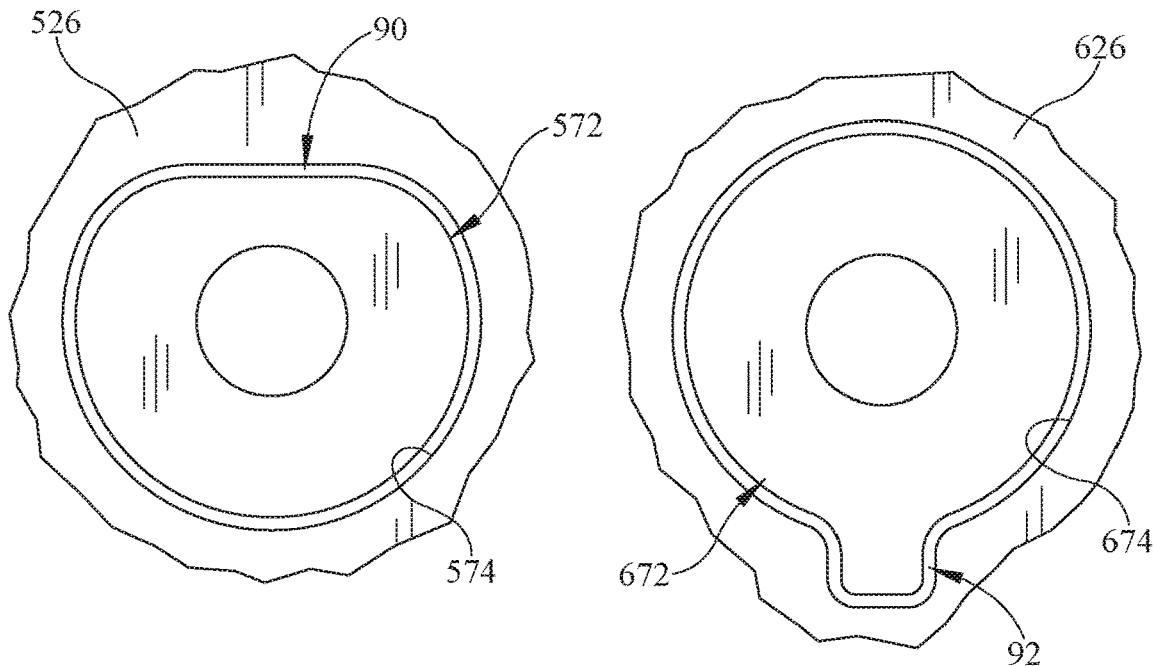
FIG. 7
FIG. 8

ASSEMBLY WITH PIN-MOUNTED CERAMIC MATRIX COMPOSITE MATERIAL COMPONENTS

FIELD OF THE DISCLOSURE

The present disclosure relates generally to gas turbine engines, and more specifically to turbine shrouds and other assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials with high temperature tolerance, such as ceramic matrix composites (CMC). Integration of CMC's with metallic components with an assembly remains an area of interest.

SUMMARY

The present disclosure may comprise one or more of the following features and combinations thereof.

According to one aspect of the present disclosure, a turbine shroud assembly for use with a gas turbine engine comprises a carrier, a blade track segment, and an attachment pin. The carrier may comprise metallic materials. The blade track segment may comprise ceramic matrix composite materials. The carrier may be arranged to extend circumferentially at least partway around an axis and formed to include a first pin-receiving aperture. The blade track segment may include a runner that faces the axis to define a portion of a primary gas path of the gas turbine engine and an attachment flange that extends radially away from the runner. The attachment flange may be formed to include a second pin-receiving aperture that extends through the attachment flange.

In some embodiments, the attachment pin includes a pin body and a load-distributing protrusion. The pin body may be arranged to extend through the second pin-receiving aperture and into the first pin-receiving aperture along a pin axis. The load-distributing protrusion may be coupled to the pin body and may extend radially outward from the pin body relative to the pin axis.

In some embodiments, the second pin-receiving aperture is defined by an aperture surface having a variable-diameter portion and a fixed-diameter portion. The variable-diameter portion extends from a first end of the aperture surface along the second pin-receiving aperture. The fixed-diameter portion extends from the variable-diameter portion to a second end of the aperture surface opposite the first end. The load-distributing protrusion is engaged with the variable-diameter portion of the aperture surface to increase a contact area between the attachment pin and the attachment flange so that loads imparted on the attachment flange by the attachment pin are spread out across the load-distributing protrusion.

In some embodiments, the load-distributing protrusion extends annularly around the pin body. The load-distributing protrusion may include a curved face that engages the variable-diameter portion of the aperture surface.

In some embodiments, the attachment flange comprises a plurality of ceramic plies and an outermost ply included in the plurality of ceramic plies extends into the second pin-receiving aperture and defines the variable-diameter portion of the aperture surface. The outermost ply may overlap at least one interior ply and the load-distributing protrusion may engage the outermost ply to distribute loads through the outermost ply and the at least one interior ply.

In some embodiments, the attachment pin further includes a compliance sleeve positioned between the pin body and the attachment flange of the blade track segment. The compliance sleeve may be positioned between the load-distributing protrusion and the attachment flange of the blade track segment.

In some embodiments, a spacer may be engaged with the attachment pin and the carrier and positioned adjacent to the first pin receiving aperture in a cavity formed in the carrier. The spacer may be configured to apply a load on the load-distributing protrusion to bias the load-distributing protrusion into engagement with the variable-diameter portion of the aperture surface. The spacer may be formed to include an anti-rotation feature that cooperates with the carrier to block rotation of the spacer relative to the carrier.

According to another aspect of the present disclosure, a turbine engine assembly comprises a carrier component, a heat shield component, and an attachment pin. The carrier component may comprise metallic materials and may be formed to include a first pin-receiving aperture. The heat shield component may be supported by the carrier component and may comprise ceramic matrix composite materials. The heat shield component may be formed to include a second pin-receiving aperture that extends therethrough.

In some embodiments, the attachment pin includes a pin body and a load-distributing protrusion. The pin body may be arranged to extend through the second pin-receiving aperture and into the first pin-receiving aperture along a pin axis. The load-distributing protrusion may extend radially outward from the pin body relative to the pin axis.

In some embodiments, the second pin-receiving aperture is defined by an aperture surface that includes a variable-diameter portion and a fixed-diameter portion. The load-distributing protrusion may have an outer surface that complements and engages the variable-diameter portion.

In some embodiments, the load-distributing protrusion extends annularly around the pin body and includes a curved face that engages the variable-diameter portion of the aperture surface. In some embodiments, the attachment pin further includes a compliance sleeve positioned between the pin body and the attachment flange of the heat shield.

In some embodiments, the compliance sleeve is positioned between the load-distributing protrusion and the attachment flange of the heat shield. In some embodiments, a spacer is engaged with the attachment pin and the carrier and positioned adjacent to the first pin receiving aperture in a cavity formed in the carrier. In some embodiments, the spacer is configured to apply a load on the load-distributing protrusion to bias the load-distributing protrusion into engagement with the variable-diameter portion of the aperture surface.

According to another aspect of the present disclosure, a method includes providing a carrier comprising metallic materials. The carrier may be formed to include a first pin-receiving aperture. The method may further include providing a blade track segment comprising ceramic matrix composite materials. The blade track segment may be formed to include a second pin-receiving aperture defined by an aperture surface that has a variable-diameter portion and a fixed-diameter portion.

In some embodiments, the method further includes inserting an attachment pin into the first pin-receiving aperture and the second pin-receiving aperture to couple the blade track segment to the carrier. The attachment pin may include a pin body and a load-distributing protrusion that extends away from the pin body.

In some embodiments, the method may further include engaging the variable-diameter portion with the load-distributing protrusion to establish a contact area between the attachment pin and the blade track segment so that loads imparted on the blade track segment by the attachment pin are distributed across the contact area. In some embodiments, the pin body extends through the second pin-receiving aperture and into the first pin-receiving aperture along a pin axis, and the load-distributing protrusion is coupled to the pin body and extends radially outward from the pin body relative to the pin axis. In some embodiments, the load-distributing protrusion extends annularly around the pin body and includes a curved face that engages the variable-diameter portion of the aperture surface.

In some embodiments, the method further includes a step of supporting an end of the pin body closest to the first pin receiving aperture with a spacer that is engaged with the attachment pin and the carrier and is positioned adjacent to the first pin-receiving aperture in a cavity formed in the carrier.

These and other features of the present disclosure will become more apparent from the following description of the illustrative embodiments.

BRIEF DESCRIPTION OF THE DRAWINGS

FIG. 6 is an enlarged sectional view of another embodiment of a turbine shroud segment similar to the embodiments shown in FIGS. 4 and 5 showing that the spacer is received in a cavity defined by a disk that is mounted on the carrier;

FIG. 7 is a cross sectional view of another embodiment of a spacer with a cutout shape that cooperates with walls of a cavity to provide an anti-rotation feature that limits movement of the spacer and the attachment pin relative to the carrier; and FIG. 8 is a cross sectional view of another embodiment of a spacer with a tab that cooperates with walls of a cavity to provide an anti-rotation feature that limits movement of the spacer and the attachment pin relative to the carrier.

DETAILED DESCRIPTION OF THE DRAWINGS

Figure 1:
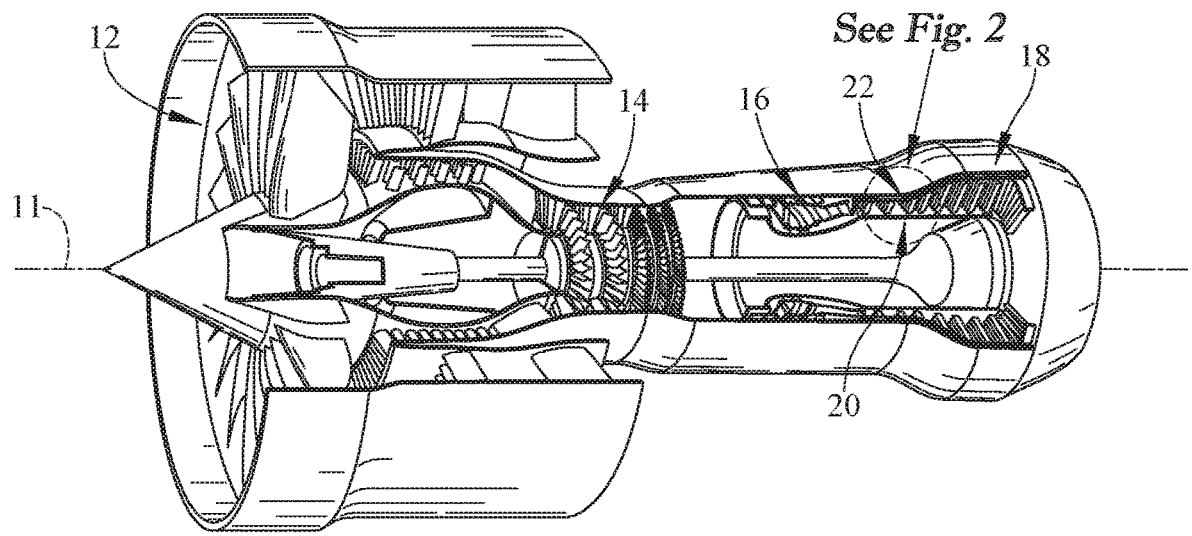
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Figure 2:
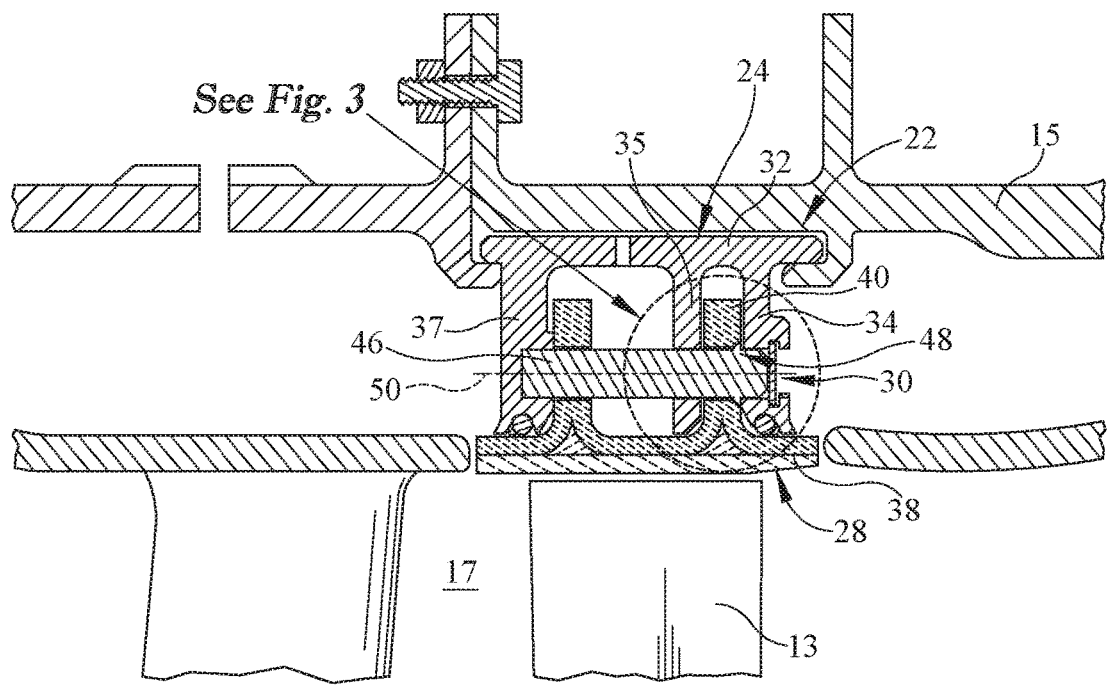
FIG. 2 is a cross-sectional view of a turbine shroud segment included in the turbine from in FIG. 1 showing that the turbine shroud segment includes a carrier, a blade track segment made from ceramic matrix composite materials, and an attachment pin configured to couple the blade track segment with the carrier.

The turbine 18 includes at least one turbine wheel assembly 20 and a turbine shroud assembly 22 positioned to surround the turbine wheel assembly 20 as shown in FIGS. 1 and 2. The turbine shroud assembly 22 is coupled to an outer case 15 of the gas turbine engine 10. The turbine wheel assembly 20 includes a plurality of blades 13 coupled to a rotor disk for rotation therewith. The hot, high pressure combustion products from the combustor 16 are directed toward the blades 13 of the turbine wheel assemblies 20 along a flow path 17. The blades 13 are in turn pushed by the combustion products to cause the turbine wheel assembly 20 to rotate; thereby, driving the rotating components of the compressor 14 and/or the fan 12.

Figure 3:
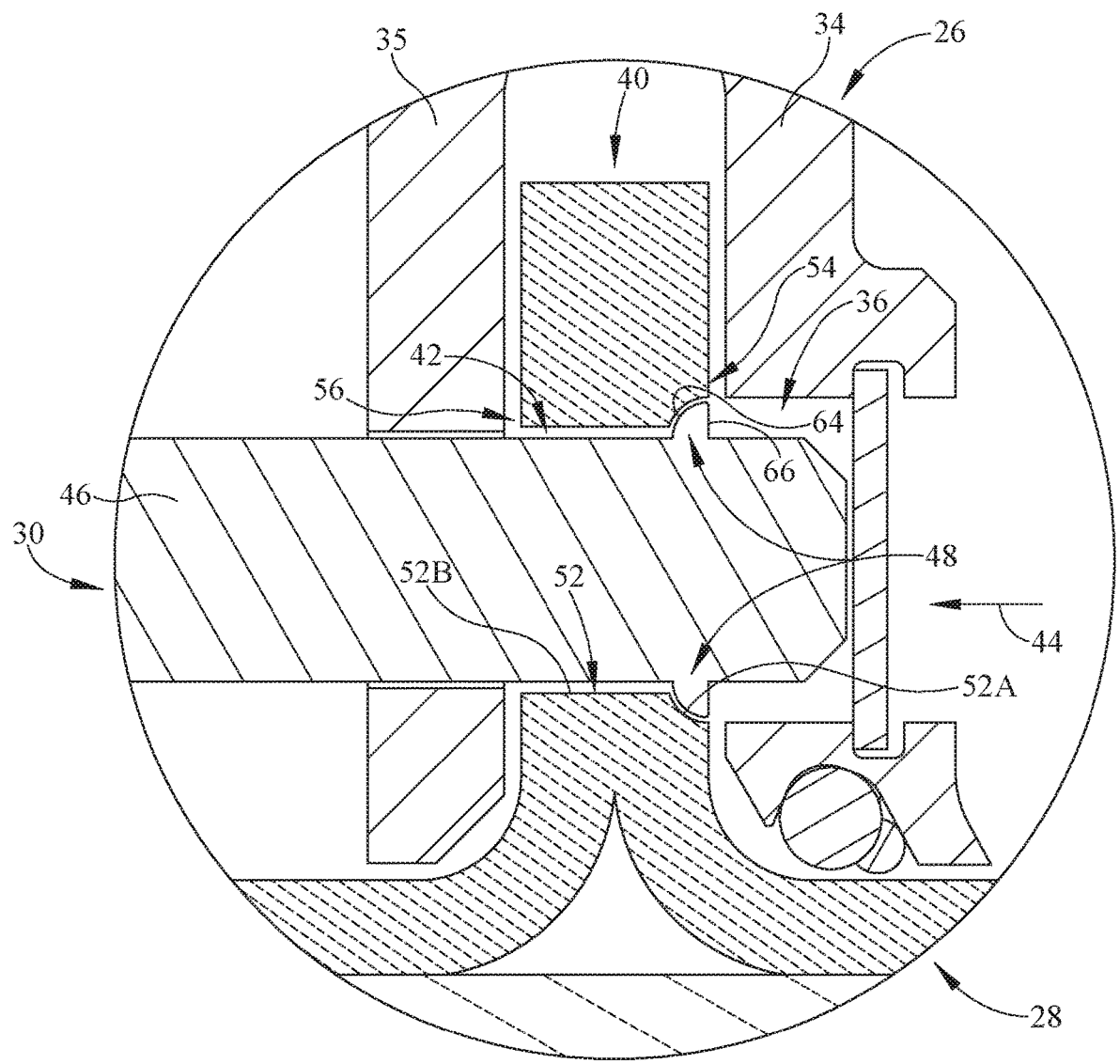
FIG. 3 is an enlarged sectional view of a portion of the turbine shroud segment from FIG. 2 showing that the attachment pin includes a pin body and a load-distributing protrusion that extends outwardly from the pin body and engages the blade track segment to increase a contact area between the attachment pin and the blade track segment.

The turbine shroud assembly 22 extends around the turbine wheel assembly 20 to block combustion products from passing over the blades 13 without pushing the blades 13 to rotate as suggested in FIG. 2. In the illustrative embodiment, the turbine shroud assembly 22 is made up of a number of shroud segments 24, one of which is shown in FIGS. 2 and 3, that extend only part-way around the central axis 11 and cooperate to surround the turbine wheel assembly 20. The shroud segments 24 are sealed against one another, such as by strip seal members, to provide a continuous turbine shroud assembly 22. In other embodiments, the turbine shroud assembly 22 is annular and non-segmented to extend fully around the central axis 11 and surround the turbine wheel assembly 20. In yet other embodiments, certain components of the turbine shroud assembly 22 are segmented while other components are annular and non-segmented.

Each shroud segment 24 includes a carrier 26, a blade track segment 28, and an attachment pin 30 as shown in FIGS. 2 and 3. The carrier 26 is a metallic component mounted in engine 10 and is configured to support the blade track segment 28 in position adjacent to the blades 13 of the turbine wheel assembly 20. The blade track segment 28 illustratively comprises ceramic-matrix composite materials and is adapted to withstand high temperatures. The blade track segment 28 directly faces blades 13 and interfaces with high temperature gasses in the flow path 17. There could be more than one blade track segment 28 per carrier 26 in other embodiments. The attachment pin 30 is configured to couple the blade track segment 28 to the carrier 26 to position the blade track segment 28 in a predetermined location relative to the blades 13.

The carrier 26 extends circumferentially at least partway around the central axis 11 and includes a support panel 32 and at least one support flange 34 as shown in FIG. 2. The support panel 32 extends axially relative to the central axis 11 and is coupled to the turbine case 22. The support flange 34 extends inwardly from the support panel toward the central axis 11. The support flange 34 is formed to include a first pin-receiving aperture 36 that extends axially through the support flange 34 as shown in FIGS. 2 and 3. The carrier 36 may have other support flanges 35, 37 that also extend inwardly from the support panel 32 and engage the attachment pin 30.

The blade track segment 28 is positioned directly inward from the carrier 26 and includes a runner 38 and at least one attachment flange 40 as shown in FIG. 2. The runner 38 provides a radially outer boundary for flowpath 17 and faces the central axis 11 to define a portion of a primary gas path of the gas turbine engine 10. The attachment flange 40 extends radially outward away from the runner 38 toward the support panel 32. The attachment flange 40 is aligned with the support flange 34 of the carrier 26 and is formed to include a second pin-receiving aperture 42 that extends through the attachment flange 40. The second pin receiving aperture 42 is aligned with the first pin-receiving aperture 36.

The attachment pin 30 is configured to extend through the first and second pin-receiving apertures 36, 42 in a direction indicated by arrow 44 as shown in FIG. 3. The attachment pin 30 includes a pin body 46 and a load-distributing protrusion 48 coupled to the pin body 46. The pin body 46 extends axially along a pin axis 50 through the first and second pin-receiving apertures 36, 42 to mount the blade track segment 28 to the carrier 26. The load-distributing protrusion 48 extends radially outward from the pin body 46 relative to the pin axis 50 and engages the attachment flange 40 of the blade track segment 28 to distribute loads through an increased contact area with the attachment flange 40.

The second pin-receiving aperture 42 is defined by an aperture surface 52 of the attachment flange 40 that has a variable-diameter portion 52A and a fixed-diameter portion 52B as shown in FIG. 3. The variable-diameter portion 52A extends from a first end 54 of the aperture surface 52 into the second pin-receiving aperture 42. A diameter of the variable-diameter portion 52A narrows as the aperture surface 52 extends from the first end 54 into the second pin-receiving aperture 42. The fixed-diameter portion 52B extends from the variable-diameter portion 52A to a second end 56 of the aperture surface 52 that is opposite the first end 54.

The load-distributing protrusion 48 is engaged with the variable-diameter portion 52A of the aperture surface 52 to increase the contact area between the attachment pin 30 and the attachment flange 40. Loads imparted on the attachment flange 40 by the attachment pin 30 are spread by the increased contact area provided by the interface between the load-distributing protrusion 48 and the variable-diameter portion 52A. As a result, wear and fretting on the blade track segment 28 by the attachment pin 30 is decreased and the useful life of the blade track segment 28 is increased.

The blade track segment 28 in the illustrative embodiment is made from ceramic matrix composite materials that comprise a plurality of ceramic preform plies 28P that are infiltrated with ceramic matrix material 28M. The plurality of ceramic preform plies 28P are layered next to one another and molded to form a desired shape and thickness for the blade track segment 28. Each of the ceramic preform plies 28P are infiltrated with the ceramic matrix material 28M to integrate the plies together and form a one-piece, ceramic matrix composite blade track segment 28.

The second pin-receiving aperture 42 may be machined through the attachment flange 40 and to include the variable-diameter portion 52A and the fixed-diameter portion 52B. Alternatively or additionally, the second pin-receiving aperture 42 may be formed into the attachment flange 40 using a suitably shaped mandrel that matches a contour of the attachment pin 30. In the illustrative embodiment an outermost ply 60 included in the plurality of preform plies 28P extends into the second pin-receiving aperture 42 and defines the variable-diameter portion 52A of the aperture surface 52. The outermost ply 60 overlaps at least one interior ply 62. The load-distributing protrusion 48 engages the outermost ply 60 to distribute loads through the outermost ply 60 and the at least one interior ply 62. The load-distributing protrusion 48 may apply a compressive force on the outermost ply 60 such that the outermost ply 60 folds into the second pin-receiving aperture 42. The load-distributing protrusion 48 envelops the at least on interior ply 62 to retain each of the plurality of plies 28P together.

The load-distributing protrusion 48 is configured to maximize line contact areas and minimizes point contact areas between the attachment pin 30 and the attachment flange 40. The load-distributing protrusion 48 extends annularly and continuously around the pin body 46. The load-distributing protrusion 48 includes a curved face 64 that engages the variable-diameter portion 52A of the aperture surface 52 and a planar face 66 that faces in away from the attachment flange 40. The curved face 64 is smooth and matches the variable-diameter portion 52A of the aperture surface 52 to provide a maximum contact area between the load-distributing protrusion 48 and the attachment flange 40.

In the illustrative embodiment, the curved face 64 has a convex dome shape while the variable-diameter portion 52A of the aperture surface 52 have a complementary concave shape to the convex dome shape as shown in FIG. 3. A slope of the curved face 64 increases as the curved face 64 extends further into the second pin-receiving aperture 42. The shape of the load-distributing protrusion 48 may take other forms in other embodiments. Additionally, the planar face 66 may also be curved similarly to the curved face 64 in other embodiments.

Figure 4:
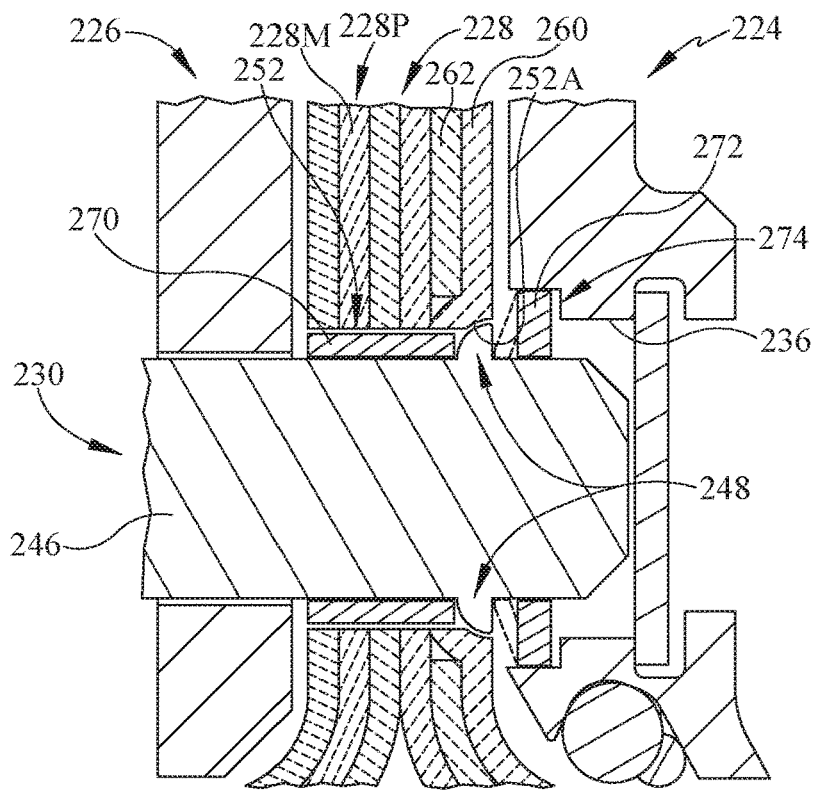
FIG. 4 is an enlarged sectional view of another embodiment of a turbine shroud segment in accordance with the present disclosure including an attachment pin with a compliance sleeve and a spacer.

Another embodiment of a turbine shroud segment 224 is partially shown in FIG. 4. The turbine shroud segment 224 is substantially similar to turbine shroud segment 24. Similar reference numbers in the 200 series are used to describe common features between turbine shroud segment 24 and turbine shroud segment 224. The description above for turbine shroud segment 24 is incorporated by reference for turbine shroud assembly 224 and differences between turbine shroud segment 24 and turbine shroud segment 224 are described below.

The turbine shroud segment 224 includes a carrier 226, a blade track segment 228, and an attachment pin 230 for mounting the blade track segment 228 to the carrier 226 as shown in FIG. 4. Like attachment pin 30, attachment pin 230 includes a pin body 246 and a load-distributing protrusion 248. The attachment pin 230 further includes a compliance sleeve 270 and a spacer 272 as shown in FIG. 4. The compliance sleeve 270 is positioned between the pin body 246 and the attachment flange 240 of the blade track segment 228. The spacer 272 is engaged with an end of the pin body 246 and the carrier 226 and is positioned adjacent to the first pin-receiving aperture 236 in a cavity 274 formed in the carrier 226.

The compliance sleeve 270 and the spacer 272 are configured to bear loads exerted between the attachment pin and the blade track segment 228 and between the attachment pin 230 and the carrier 226. The compliance sleeve 270 is formed from sheet metal and is substantially cylindrical. Some suitable materials for the compliance sleeve 270 include, but are not limited to, a cobalt based metal or a nickel based metal. The sleeve 270 may also be coated with an aluminide to resist silicon attack from the blade track segment 228.

The compliance sleeve 270 is configured to deform under load so that the attachment flange 240 of the blade track segment 228 is not damaged by the load. The compliance sleeve 270 is sized relative to the second pin-receiving space 244 such that it is slightly loose at cold build. The size of the sleeve relative to the second pin-receiving space 244 allows the sleeve 270 to grow when subjected to elevated temperatures such that an interference fit is provided between the sleeve 270 and the blade track segment 228 during operation.

The spacer 272 is formed from metallic materials and is configured to support the end of the pin body 246 against the carrier 226 to block movement of the end of the pin body 246 relative to the carrier 226. This limits movement of the attachment pin 230 relative to the blade track segment 228 and, hence, loads applied on the blade track segment 228 by the attachment pin 230. In some embodiments, the spacer 272 is a Belleville washer as suggested by the dashed lines shown in FIG. 4. The spacer 272 may be configured to apply a load on the load-distributing protrusion 248 to bias the load-distributing protrusion 248 into engagement with the variable-diameter portion 252A of the aperture surface 252.

Figure 5:
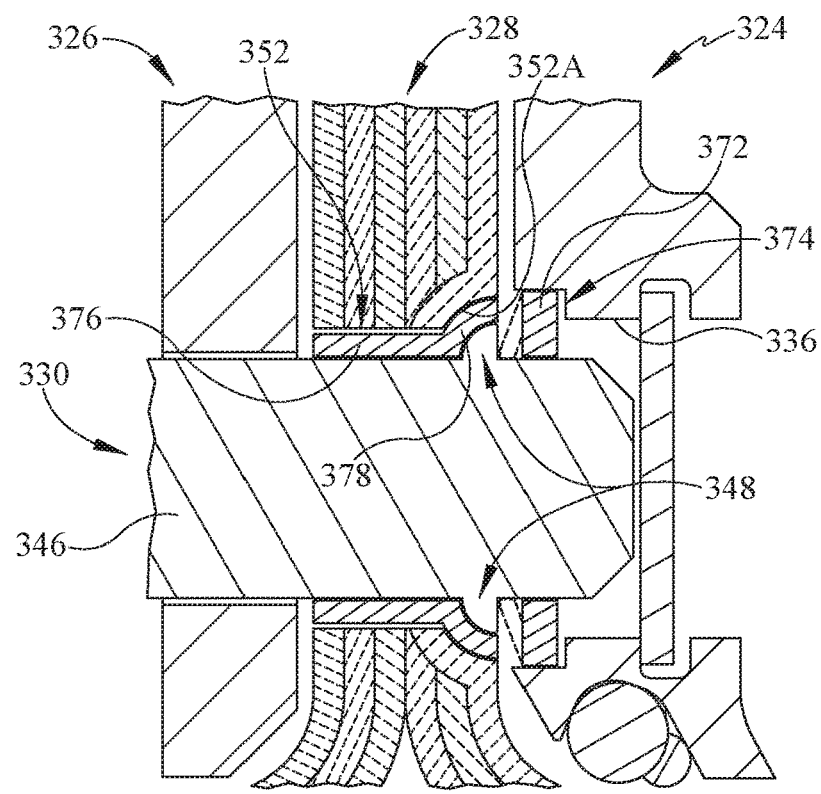
FIG. 5 is an enlarged sectional view of another embodiment of a turbine shroud segment similar to the embodiment shown in FIG. 4 showing that the compliance sleeve includes a cylindrical section and a protrusion section.

Another embodiment of a turbine shroud segment 324 is partially shown in FIG. 5. The turbine shroud segment 324 is substantially similar to turbine shroud segments 24 and 224. Similar reference numbers in the 300 series are used to describe common features between turbine shroud segments 24, 224 and turbine shroud segment 324. The description above for turbine shroud segments 24, 224 is incorporated by reference for turbine shroud segment 324 and differences between turbine shroud segments 24, 224 and turbine shroud segment 324 are described below.

The turbine shroud segment 324 includes a carrier 326, a blade track segment 328, and an attachment pin 330 for mounting the blade track segment 328 to the carrier 326 as shown in FIG. 5. Like attachment pin 30, attachment pin 330 includes a pin body 346 and a load-distributing protrusion 348. The attachment pin 330 further includes a compliance sleeve 370 and a spacer 372 as shown in FIG. 5. The compliance sleeve 370 is positioned between the pin body 346 and the attachment flange 340 of the blade track segment 328. The spacer 372 is engaged with an end of the pin body 346 and the carrier 326 and is positioned adjacent to the first pin-receiving aperture 336 in a cavity 374 formed in the carrier 326.

The compliance sleeve 370 and the spacer 372 are configured to bear loads exerted between the attachment pin 330 and the blade track segment 328 and between the attachment pin 330 and the carrier 326. The compliance sleeve 370 is configured to deform under load so that the attachment flange 240 of the blade track segment 228 is not damaged by the load. The compliance sleeve 370 is formed from sheet metal and includes a cylindrical section 376 and a protrusion section 378. The cylindrical section 376 extends circumferentially around the pin body 346 radially between the attachment flange 340 and the attachment pin 330. The protrusion section 378 extends circumferentially around the load-distributing protrusion 348 radially between the attachment pin 330 and the attachment flange 340. The protrusion section 378 has a shape and contour that matches the load-distributing protrusion 348 to provide a maximum contact area between the compliance sleeve 370 and the attachment pin 330.

The spacer 372 is formed from metallic materials and is configured to support the end of the pin body 346 against the carrier 326 to block movement of the end of the pin body 346 relative to the carrier 326. This limits movement of the attachment pin 330 relative to the blade track segment 328 and, hence, loads applied on the blade track segment 328 by the attachment pin 330. In some embodiments, the spacer 372 is a Belleville washer as suggested by the dashed lines shown in FIG. 5. The spacer 372 may be configured to apply a load on the load-distributing protrusion 348 to bias the load-distributing protrusion 348 into engagement with the variable-diameter portion 352A of the aperture surface 352.

Another embodiment of a turbine shroud segment 424 is partially shown in FIG. 6. The turbine shroud segment 424 is substantially similar to turbine shroud segment 224. Similar reference numbers in the 400 series are used to describe common features between turbine shroud segment 224 and turbine shroud segment 424. The description above for turbine shroud segment 224 is incorporated by reference for turbine shroud assembly 424 and differences between turbine shroud segment 224 and turbine shroud segment 424 are described below.

The turbine shroud segment 424 includes a carrier 426, a blade track segment 428, and an attachment pin 430 for mounting the blade track segment 428 to the carrier 426 as shown in FIG. 6. Like attachment pin 330, attachment pin 430 includes a pin body 446 and a load-distributing protrusion 448. The attachment pin 430 further includes a compliance sleeve 470 and a spacer 472 as shown in FIG. 6. The compliance sleeve 470 is positioned between the pin body 446 and the attachment flange 440 of the blade track segment 428. The spacer 472 is engaged with an end of the pin body 446 and the carrier 46 and is positioned adjacent to the first pin-receiving aperture 436 in a cavity 474 formed in the carrier 426. The compliance sleeve 470 and the spacer 472 are substantially similar to compliance sleeve 270 and space 272.

The cavity 474 is defined by a disk 480 that includes a disk base 482 and a disk ring 484 that extends away from the disk base 482 as shown in FIG. 6. The disk base 482 is coupled directly to the support flange 434 of the carrier 426 by welding, brazing, or another suitable joining process. The disk ring 484 extends toward the attachment pin 430 and defines the cavity 474 in which the spacer 472 is set.

The spacers 272, 372, 472 may include anti-rotation features to limit movement of the spacers 272, 372, 472 relative to the carriers 26, 226, 326, 426 as shown in FIGS. 7 and 8. For example, a spacer 572 similar to spacers 272, 372, 472 may have substantially circular shape with a cutout section 90 as shown in FIG. 7. In another example, a spacer 672 similar to spacers 272, 372, 472 may have substantially circular shape with a tab section 92 as shown in FIG. 8. Cavities 574, 674 would have a shape that corresponds to the cutout section 90 and the tab section 92 so that the spacers 572, 672 cooperate with the walls defining the cavities 574, 674 to block movement of the spacers 572, 672 relative to carriers 526, 626.

Although the present disclosure shows and describes various turbine shroud segments 24, 224, 324, 424, the attachment pins 30, 230, 330, 430 may be used in other areas of the gas turbine engine 10 as well. For example, the carrier 26, 226, 326, 426 may be any component that is configured to support another component in the gas turbine engine 10. The blade track segments 28, 228, 328, 428 are exemplary heat shields and use of such heat shields as combustor tiles, exhaust ducts, or other components is also contemplated by this disclosure. The attachment pins 30, 230, 330, 430 may also be used in such embodiments as a part of combustors, exhaust systems, and other assemblies.

Some embodiments of the present disclosure may provide a method for supporting a CMC seal segment using a domed bolt 30 with varying radii. The bolt may carry loads through a compliance shell. The domed bolt may include a compliance shell with modified dimensions. Loads may be distributed over a much larger interface (contact) areas between the bolt and the CMC interface.

In some embodiments, the domed bolt may have a much larger contact area to the interface of a CMC segment. Bolts with a constant radius may make high concentrated stress contact to the interface of the CMC segment. Such stresses may be a line or even a point contact, especially if the bolt does not have a symmetric loading to the two ends that assembled into the carrier. The attachment pin 30 in the present disclosure has a load-distributing protrusion 48 that varies the radius of the pin 30 to increase the contact areas between the pin and the CMC interface.

In some embodiments, a compliance sleeve may be placed between the CMC segment and the solid pin. The same concept applies here: increase the contact interface area between the pin and the CMC segment. In some embodiments, compliance sleeves may be added to the right side, or the aft side of the domed bolt only. In some embodiments, compliance sleeves are added to both the left side and the right side of the domed bolt, in case the left side of the bolt makes contacts to the CMC segment. A floating spacer(s) may be needed between the compliance sleeve and the carrier.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
    a carrier comprising metallic materials, the carrier arranged to extend circumferentially at least partway around an axis and formed to include a first pin-receiving aperture,
    a blade track segment comprising ceramic matrix composite materials, the blade track segment including a runner that faces the axis to define a portion of a primary gas path of the gas turbine engine and an attachment flange that extends radially away from the runner, the attachment flange being formed to include a second pin-receiving aperture that extends through the attachment flange, and
    an attachment pin including a pin body and a load-distributing protrusion, the pin body arranged to extend through the second pin-receiving aperture and into the first pin-receiving aperture along a pin axis, and the load-distributing protrusion being coupled to the pin body and extending radially outward from the pin body relative to the pin axis,
        wherein the second pin-receiving aperture is defined by an aperture surface having (i) a variable-diameter portion and (ii) a fixed-diameter portion, wherein the variable-diameter portion extends from a first end of the aperture surface along the second pin-receiving aperture and the fixed-diameter portion extends from the variable-diameter portion to a second end of the aperture surface opposite the first end, and wherein the load-distributing protrusion is engaged with the variable-diameter portion of the aperture surface to increase a contact area between the attachment pin and the attachment flange so that loads imparted on the attachment flange by the attachment pin are spread out across the load-distributing protrusion,
    wherein the load-distributing protrusion extends annularly around the pin body and the load-distributing protrusion includes a curved face that engages the variable-diameter portion of the aperture surface.

2. The turbine shroud assembly of claim 1, wherein the attachment flange comprises a plurality of ceramic plies and an outermost ply included in the plurality of ceramic plies extends into the second pin-receiving aperture and defines the variable-diameter portion of the aperture surface.

3. The turbine shroud assembly of claim 2, wherein the outermost ply overlaps at least one interior ply and the load-distributing protrusion engages the outermost ply to distribute loads through the outermost ply and the at least one interior ply.

4. The turbine shroud assembly of claim 1, wherein the attachment pin further includes a compliance sleeve positioned between the pin body and the attachment flange of the blade track segment.

5. The turbine shroud assembly of claim 4, wherein the compliance sleeve is positioned between the load-distributing protrusion and the attachment flange of the blade track segment.

6. The turbine shroud assembly of claim 1, further comprising a spacer engaged with the attachment pin and the carrier and positioned adjacent to the first pin receiving aperture in a cavity formed in the carrier.

7. The turbine shroud assembly of claim 6, wherein the spacer is configured to apply a load on the load-distributing protrusion to bias the load-distributing protrusion into engagement with the variable-diameter portion of the aperture surface.

8. The turbine shroud assembly of claim 6, wherein the spacer is formed to include an anti-rotation feature that cooperates with the carrier to block rotation of the spacer relative to the carrier.

9. The turbine shroud assembly of claim 1, wherein the attachment pin removably couples the blade track segment to the carrier.

10. The turbine shroud assembly of claim 1, wherein a terminal end of the attachment pin that is located in the first pin-receiving aperture of the carrier.

11. A turbine engine assembly comprising
a carrier component comprising metallic materials and that is formed to include a first pin-receiving aperture,
a heat shield component supported by the carrier component and comprising ceramic matrix composite materials, the heat shield component formed to include a second pin-receiving aperture that extends therethrough, and
an attachment pin including a pin body and a load-distributing protrusion, the pin body arranged to extend through the second pin-receiving aperture and into the first pin-receiving aperture along a pin axis, the load-distributing protrusion extending radially outward from the pin body relative to the pin axis,
wherein the second pin-receiving aperture is defined by an aperture surface that includes a variable-diameter portion and a fixed-diameter portion, the load-distributing protrusion having an outer surface that complements and engages the variable-diameter portion, and the load-distributing protrusion is spaced apart axially from a terminal end of the attachment pin that is located in the first pin-receiving aperture of the carrier.

12. The turbine engine assembly of claim 11, wherein the load-distributing protrusion extends annularly around the pin body and includes a curved face that engages the variable-diameter portion of the aperture surface.

13. The turbine engine assembly of claim 11, wherein the attachment pin further includes a compliance sleeve positioned between the pin body and the attachment flange of the heat shield.

14. The turbine engine assembly of claim 13, wherein the compliance sleeve is positioned between the load-distributing protrusion and the attachment flange of the heat shield.

15. The turbine engine assembly of claim 11, further comprising a spacer engaged with the attachment pin and the carrier and positioned adjacent to the first pin receiving aperture in a cavity formed in the carrier.

16. The turbine engine assembly of claim 15, wherein the spacer is configured to apply a load on the load-distributing protrusion to bias the load-distributing protrusion into engagement with the variable-diameter portion of the aperture surface.

17. A method comprising
providing a carrier comprising metallic materials, the carrier being formed to include a first pin-receiving aperture,
providing a blade track segment comprising ceramic matrix composite materials, the blade track segment being formed to include a second pin-receiving aperture defined by an aperture surface that has a variable-diameter portion and a fixed-diameter portion,
inserting an attachment pin into the first pin-receiving aperture and the second pin-receiving aperture to removably couple the blade track segment to the carrier, the attachment pin including a pin body and a load-distributing protrusion that extends away from the pin body, and
engaging the variable-diameter portion with the load-distributing protrusion to establish a contact area between the attachment pin and the blade track segment so that loads imparted on the blade track segment by the attachment pin are distributed across the contact area.

18. The method of claim 17, wherein the pin body extends through the second pin-receiving aperture and into the first pin-receiving aperture along a pin axis, and the load-distributing protrusion is coupled to the pin body and extends radially outward from the pin body relative to the pin axis.

19. The turbine engine assembly of claim 18, wherein the load-distributing protrusion extends annularly around the pin body and includes a curved face that engages the variable-diameter portion of the aperture surface.

20. The turbine engine assembly of claim 17, further comprising a step of supporting an end of the pin body closest to the first pin receiving aperture with a spacer that is engaged with the attachment pin and the carrier and is positioned adjacent to the first pin-receiving aperture in a cavity formed in the carrier.

* * * * *